(12) United States Patent
Ramirez et al.

(10) Patent No.: US 10,324,784 B2
(45) Date of Patent: *Jun. 18, 2019

(54) MITIGATING CRASHES OF AN APPLICATION SERVER EXECUTING A MONITORING AGENT

(71) Applicant: New Relic, Inc., San Francisco, CA (US)

(72) Inventors: Sebastian Ramirez, Portland, OR (US); Andrew Kent, Portland, OR (US)

(73) Assignee: New Relic, Inc., San Francisco, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/643,185

(22) Filed: Jul. 6, 2017

(65) Prior Publication Data

US 2017/0308423 A1    Oct. 26, 2017

Related U.S. Application Data

(63) Continuation of application No. 14/880,078, filed on Oct. 9, 2015, now Pat. No. 9,727,406.

(51) Int. Cl.
*G06F 11/00* (2006.01)
*G06F 11/07* (2006.01)
*H04L 12/26* (2006.01)
*G06F 11/34* (2006.01)

(52) U.S. Cl.
CPC .......... *G06F 11/079* (2013.01); *G06F 11/008* (2013.01); *G06F 11/0709* (2013.01); *G06F 11/0754* (2013.01); *G06F 11/0793* (2013.01); *G06F 11/34* (2013.01); *G06F 11/3409* (2013.01); *H04L 43/04* (2013.01); *H04L 43/0817* (2013.01)

(58) Field of Classification Search
CPC .. G06F 12/0253; G06F 11/34; G06F 11/3409; G06F 11/0793; G06F 11/3452; G06F 11/3612; G06F 11/3616; G06F 11/079
See application file for complete search history.

(56) References Cited

U.S. PATENT DOCUMENTS

| 9,384,129 | B2 | 7/2016 | Basu et al. |
| 9,727,406 | B2 * | 8/2017 | Ramirez ............... G06F 11/079 |
| 2012/0254652 | A1 * | 10/2012 | Katiyar ............... H04L 41/0695 714/4.1 |
| 2012/0284569 | A1 | 11/2012 | Dunne et al. |

(Continued)

OTHER PUBLICATIONS

United States Office Action, U.S. Appl. No. 14/880,078, filed Feb. 8, 2017, 8 pages.

*Primary Examiner* — Charles Ehne
(74) *Attorney, Agent, or Firm* — Fenwick & West LLP

(57) ABSTRACT

A software circuit breaker observes an amount of free memory available in an application server and a duration of a garbage collection process performed by the application server. The application server executes an agent comprising a plurality of processes for monitoring performance of the application server. Based on the amount of free memory and duration of the garbage collection process, the circuit breaker anticipates a likely crash of the application server. In response to anticipating the likely crash, the circuit breaker disables one or more processes of the agent.

20 Claims, 2 Drawing Sheets

(56) References Cited

U.S. PATENT DOCUMENTS

| | | | |
|---|---|---|---|
| 2014/0032962 A1* | 1/2014 | Deshpande | G06F 11/0793 714/15 |
| 2014/0137131 A1 | 5/2014 | Dheap et al. | |
| 2015/0095338 A1 | 4/2015 | Baggott et al. | |
| 2015/0095892 A1 | 4/2015 | Baggott et al. | |
| 2015/0242312 A1 | 8/2015 | Ideue et al. | |

* cited by examiner

MITIGATING CRASHES OF AN APPLICATION SERVER EXECUTING A MONITORING AGENT

CROSS-REFERENCE TO RELATED APPLICATIONS

This patent application is a continuation of U.S. patent application Ser. No. 14/880,078, filed on Oct. 9, 2015 which is incorporated by reference in its entirety.

BACKGROUND

This disclosure relates generally to monitoring application servers, and in particular to disabling an agent monitoring an application server in response to anticipating a crash of the application server.

Web-based and mobile applications are common tools for delivering content and services to user computing devices. These applications are executed by application servers, which provide content to the computing devices and respond to requests from the computing devices. To avoid disruptions in the functionality of an application, an application server may additionally execute a program to monitor the server and application. Monitoring an application server enables an administrator of the server to verify the application server is running properly and detect performance issues in the application. However, the monitoring program typically uses a portion of the server's resources that would otherwise be available to the application. During times that the application is consuming a high percentage of the server's resources, the extra resources used by the monitoring program may crash the application server and interrupt service of the application.

SUMMARY

A software circuit breaker observes resources available in an application server. The application server, which provides an application (such as a web or mobile application), executes an agent having a plurality of processes for monitoring performance of the application server. The circuit breaker observes an amount of free memory available in the application server, as well as a duration of a garbage collection process removing unused objects from the memory of the application server. Based on the amount of free memory and duration of the garbage collection process, the circuit breaker anticipates a likely crash of the application server. For example, the circuit breaker anticipates a crash if the amount of free memory is less than a memory threshold and the duration of the garbage collection process is greater than a garbage collection time threshold. In response to anticipating the crash, the circuit breaker disables one or more processes of the agent (e.g., one or more resource-intensive processes) to free up server resources for use by the application.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
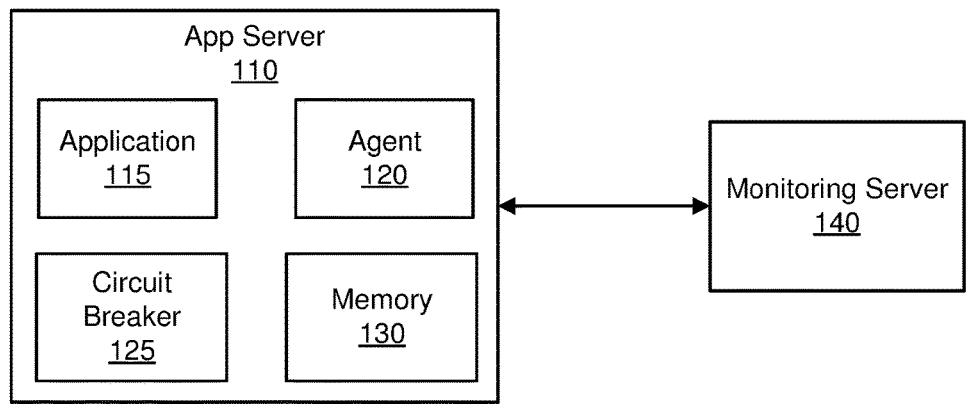
FIG. 1 illustrates a system environment for monitoring an application server, according to one embodiment.

FIG. 1 illustrates a system environment for monitoring an application server, according to one embodiment. In one embodiment, the environment includes the application ("app") server 110 and a monitoring server 140. The app server 110 and monitoring server 140 may communicate over a network, such as the Internet.

The app server 110 operates an application 115. The application 115 may be any of a variety of types of mobile applications or web applications, and may represent a subset of operations of a client-server application. For example, the application 115 operated by the app server 110 includes any server-side processes of a client-server application, such as retrieving and storing database content, generating user interfaces for rendering at the client device, performing functions requested at the client device, and communicating content to the client device (e.g., over a network). Although a single app server 110 is shown in FIG. 1, the app server 110 may comprise one or more computing devices executing the functions of the application 115.

In one embodiment, the app server 110 includes a computing device executing a Java virtual machine for running processes of the application 115. The virtual machine provides an environment for running the application 115, and manages objects created by the application 115 and a portion of memory 130 used by the application 115. In particular, the virtual machine allocates memory by moving objects, including variables or data structures created during execution of the application 115 and agent 120, between pools of memory to efficiently manage the available memory 130. The virtual machine also executes garbage collection processes to identify and remove objects no longer used or referenced in the application 115 to free up the memory occupied by the unused objects for storing other objects. In general, the garbage collection processes check objects in the memory 130 of the app server 110 for references to other objects. If references to an object do not exist, the garbage collection process determines the object is unused and removes (or "collects") the object, thereby making the memory previously used by the collected object available for other purposes. While performing garbage collection, the virtual machine may move older objects (e.g., objects greater than a threshold age or that have survived at least a threshold number of garbage collections) to a tenured pool in the memory 130. The objects in the tenured pool may be checked less frequently for existing references in the application 115 than newly created objects. Thus, by moving older objects to the tenured pool and not repeatedly checking the older objects for references, the virtual machine improves the efficiency of the garbage collection process.

In one embodiment, as shown in FIG. 1, the app server 110 executes an agent 120 and a circuit breaker 125, in addition to the application 115. The agent 120 monitors performance of the application 115, such as processes running on the app server 110, response time of the application 115, transactions in the application 115, the effect of backend processes on performance of the application 115 at user devices, statistics of the virtual machine running the application 115, or other information. In one embodiment, the agent 120 links the performance information to code paths in the application 115. For example, the agent 120 identifies a code path causing halts in the application 115. The agent 120 collects and stores data relevant to performance of the application 115, and periodically reports the data to the monitoring server 140.

The circuit breaker 125 monitors the application 115 and the agent 120 to anticipate likely crashes of the app server 110. In some cases, the application 115 may be designed to periodically operate near memory limits of the app server 110. When the agent 120 is not also running on the app server 110, the app server 110 may support the high memory usage of the application 115 without crashing. However, the memory usage of the agent 120 in addition to the memory usage of the application 115 may cumulatively exhaust the resources of the app server 110 and cause a crash to occur. To avoid disrupting service of the application 115, the circuit breaker 125 disables one or more processes of the agent 120 if the circuit breaker 125 detects the app server 110 is likely to crash. By disabling at least a portion of the agent 120, the circuit breaker 125 decreases the memory usage in the app server 110, and reduces the likelihood of a crash. The circuit breaker 125 is described further with respect to FIG. 2.

The monitoring server 140 is an external computing device monitoring performance of the app server 110. The monitoring server 140 may be hosted by an application monitoring service provider, and may monitor performance of any number of app servers. In one embodiment, the monitoring server 140 is hosted by New Relic, Inc. and executes NEW RELIC APM. To monitor the app server 110, the monitoring server 140 provides the agent 120 and circuit breaker 125 to the app server 110 (e.g., as a software development kit or as a module integrated into the software of the application 115). While the app server 110 executes the agent 120 and circuit breaker 125, the monitoring server 140 communicates with the agent 120 and circuit breaker 125 to monitor performance of the app server 110. The monitoring server 140 receives reports from the agent 120 and formats data in the reports for analysis by an administrator of the app server 110, enabling the administrator to address any performance issues in the application 115. For example, the monitoring server 140 generates plots illustrating response times of the application 115, displays transaction traces of slow or otherwise notable transactions, and provides statistics from the virtual machine running the application 115.

In one embodiment, the monitoring server 140 also notifies an administrator of the app server 110 when the circuit breaker 125 is triggered for disabling processes of the agent 120. For example, the monitoring server 140 sends the app server 110 a notification separate from the performance reports shortly after the circuit breaker 125 is triggered. As another example, the monitoring server 140 sends the app server 110 an incomplete performance report, such as response times of the application 115 measured while the agent 120 was enabled. The report may flag or identify a period of time in which the response times were not measured as a period in which the agent 120 was disabled.

Figure 2:
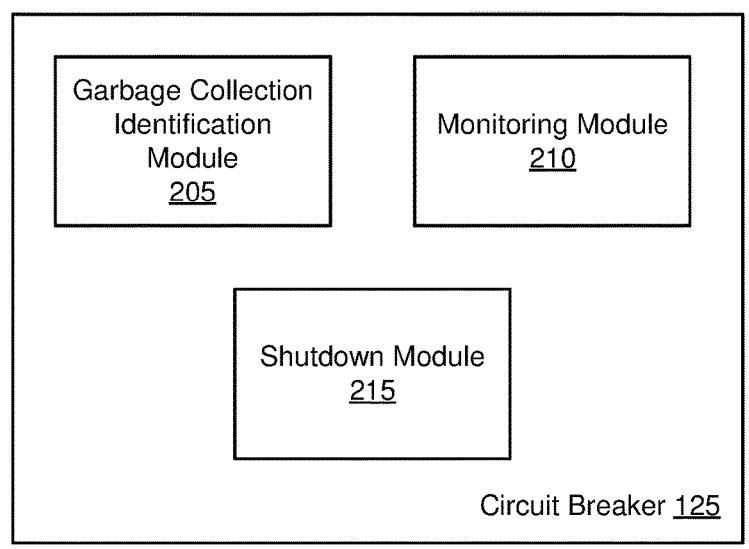
FIG. 2 is a high-level block diagram illustrating modules within a circuit breaker, according to one embodiment.

FIG. 2 is a high-level block diagram illustrating modules within the circuit breaker 125, according to one embodiment. As shown in FIG. 2, one embodiment of the circuit breaker 125 includes a garbage collection identification module 205, a monitoring module 210, and a shutdown module 215.

The garbage collection identification module 205 identifies a garbage collection process in the app server 110 for monitoring by the circuit breaker 125. As described above, the app server 110 executes garbage collection processes to identify and remove unused objects in the memory 130, freeing space for new objects to be created by the application 115 and the agent 120. In one embodiment, the app server 110 executes a first garbage collection process to remove recently created objects, and a second garbage collection process to remove older objects (that is, objects in the tenured pool). As newly created objects may be more likely to become unused before the next iteration of the first garbage collection process than older objects that have survived several collections, the first garbage collection process may in general run more frequently than the second process, and may collect more objects than the second process. The second garbage collection process may run when a threshold percentage of the tenured space is filled, or at preset intervals of time. Furthermore, while the first garbage collection process may take on the order of milliseconds to complete, the second garbage collection process may take on the order of tens of milliseconds to seconds to complete.

In one embodiment, the garbage collection process identified for monitoring by the circuit breaker 125 is the garbage collection process occurring in the tenured pool in memory of the app server 110 (that is, the garbage collection process removing the oldest objects in the virtual machine executing the application 115 and agent 120). As the number of referenced objects in the tenured space increases, the second garbage collection process spends increasingly more time identifying the referenced objects, reallocating memory by moving the referenced objects in the memory 130, and updating references to the moved objects. Accordingly, the duration of the second garbage collection process increases in proportion to the number of referenced objects. Furthermore, a greater number of referenced objects in the tenured space reduce the amount of memory the garbage collection process can free up for use by new objects. Thus, the duration of the second garbage collection process is indicative of the likelihood of the app server 110 running out of memory.

To identify the garbage collection process in the tenured pool, the garbage collection identification module 205 identifies a pool with a least amount of garbage collection. For example, the garbage collection identification module 205 queries the virtual machine for a number of garbage collections performed by the virtual machine. The virtual machine returns the number of collections performed by each of the collection processes executed by the virtual machine (that is, the number of collections in each memory pool), and the garbage collection identification module 205 identifies the pool with the fewest number of collections in a specified period of time as the tenured pool.

The monitoring module 210 monitors the identified garbage collection process and free memory of the app server 110. The monitoring module 210 receives, for the garbage collection process identified by the identification module 205, an amount of time the process has spent on garbage collection. For example, the virtual machine reports the duration of each garbage collection cycle as a number of clock cycles of a processor of the app server 110. In one embodiment, the monitoring module 210 determines an amount of time between garbage collection cycles (e.g., by calculating an amount of time between the reports received from the virtual machine) and calculates a percentage of the processor's time that is occupied by each cycle of the garbage collection process in the tenured pool. The monitoring module 210 also periodically receives an amount of free memory available in the app server 110, as a percentage of the total available memory 130. For example, the monitoring module 210 queries the virtual machine for the amount of free memory at each cycle of the garbage collection process. The monitoring module 210 reports the garbage collection times and percent free memory to the shutdown module 215.

The shutdown module 215 compares the garbage collection time and the free memory in the app server 110 to respective thresholds. If both the garbage collection time is greater than a garbage collection threshold and the free memory is less than a memory threshold, the shutdown module 215 determines the app server 110 is likely to crash and disables one or more processes of the agent 120 to mitigate the likelihood of the crash. For example, if at least 10% of the app server 110 processor's time is occupied by the garbage collection process in the tenured space, as measured by the most recent garbage collection time received from the virtual machine, and if the free memory is less than 20% of the total memory 130 available to the application 115 and agent 120, the shutdown module 215 disables processes of the agent 120 to free up server resources for the application 115. An administrator of the application 115 may adjust the thresholds to accommodate actual performance of the application 115. The shutdown module 215 may disable one or more preselected, resource-intensive processes, such as processes to store the application performance data and report the stored data to the monitoring server 140. One or more low-memory processes of the agent 120 may continue running after the shutdown module 215 disables the resource-intensive processes. In one embodiment, in response to anticipating the likely crash of the app server 110 and disabling the processes of the agent 120, the shutdown module 215 reports the likely crash and disabling of the agent 120 to the app server 110 and/or the monitoring server 140.

After disabling the processes of the agent 120, the shutdown module 215 continues to receive information from the monitoring module 210. When the resources of the app server 110 return to normal states, the shutdown module 215 re-enables the disabled processes of the agent 120 to resume monitoring of the app server 110. For example, when the garbage collection time falls below the garbage collection threshold and the free memory increases above the memory threshold, the disabled processes are re-enabled. The shutdown module 215 may alternatively compare the garbage collection time and free memory to different thresholds than those used when determining to disable the processes. For example, the shutdown module 215 compares the garbage collection time to a lower threshold and the free memory to a higher threshold to avoid frequent cycling between enabling and disabling processes of the agent 120.

Figure 3:
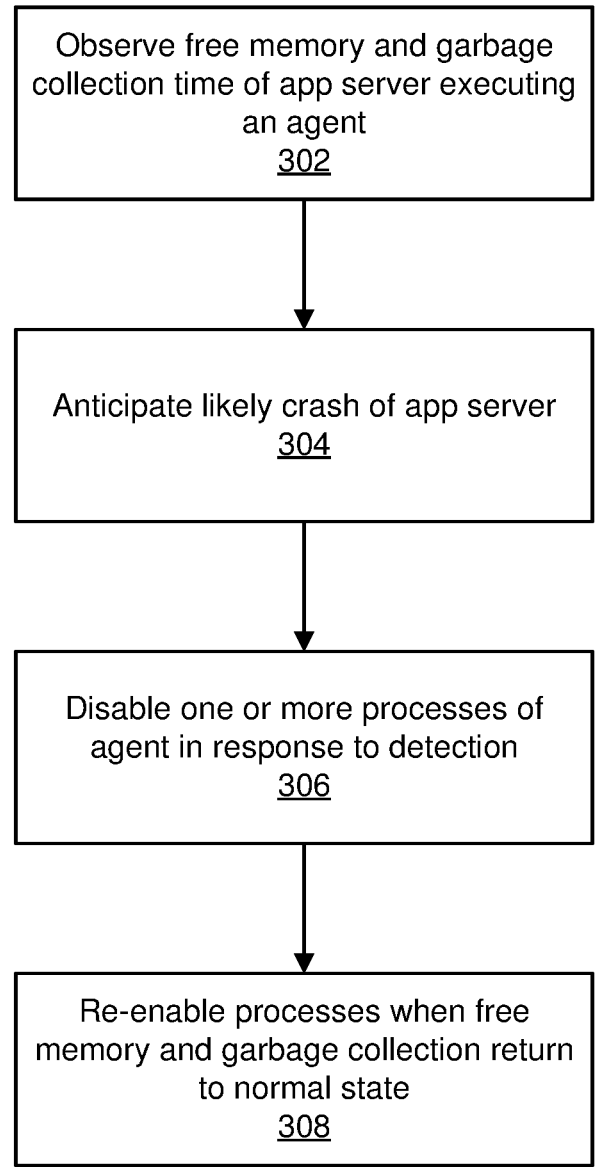
FIG. 3 is a flowchart illustrating a process for monitoring an application server, according to one embodiment.

FIG. 3 illustrates a process for monitoring the application server 110, according to one embodiment. In one embodiment, the steps of the process shown in FIG. 3 are performed by the circuit breaker 125. In other embodiments, the steps may be performed in different orders, and the process may include different, additional, or fewer steps.

The circuit breaker 125 observes 302 resources of the app server 110, including an amount of free memory available to the app server 110 and a duration of a garbage collection process in the tenured memory pool of the app server 110. In one embodiment, the circuit breaker 125 identifies the tenured pool by observing a number of garbage collections performed by each of a plurality of garbage collection processes in the app server 110 during a specified period of time. The garbage collection process performing the least amount of collections is identified as the garbage collection process in the tenured pool. In one embodiment, the circuit breaker 125 calculates a percentage of cycles of the app server 110 processor occupied by the garbage collection process.

Based on the duration of the garbage collection process and the amount of free memory, the circuit breaker 125 anticipates 304 a likely crash of the app server 110. In one embodiment, a likely crash is anticipated if the percentage of free memory available to the application 115 and agent 110 is less than a free memory threshold, and if the garbage collection time is greater than a garbage collection threshold. For example, the circuit breaker 125 asserts a first flag while the garbage collection time is above the garbage collection threshold. The circuit breaker 125 similarly asserts a second flag while the percentage of memory 130 that is free memory is below the free memory threshold. If the first and second flags are in an asserted state at the same time, the circuit breaker 125 determines a crash of the app server 110 is likely.

By comparing both the free memory and the garbage collection time to respective thresholds, the circuit breaker 125 more accurately predicts a likely crash of the app server 110. For example, the memory utilization of the app server 110 may periodically be high, but if the garbage collection processes are able to quickly remove unused objects the app server 110 may continue to create new objects without running out of memory. However, because the duration of the garbage collection process increases in proportion to the number of referenced objects, an increase in the duration of the garbage collection process is indicative of a large number of referenced objects in the tenured pool. This implies that there are few unused objects in the tenured pool, and the garbage collection process will be less likely to be able to free up the memory needed for new objects to be generated by the application 115 and agent 120.

In response to anticipating the likely crash of the app server 110, the circuit breaker 125 disables 306 one or more processes of the agent 120, such as one or more high memory utilization processes. In one embodiment, the circuit breaker 125 accesses a whitelist or blacklist of processes of the agent 120. The whitelist includes manually selected processes to not disable when a crash is anticipated, while the blacklist specifies processes that are to be disabled. When disabling 306 processes of the agent 120, the circuit breaker 125 may disable some or all of the processes on the blacklist. Alternatively, the circuit breaker 125 may disable some or all processes of the agent 120 that are not on the whitelist. In another embodiment, the circuit breaker 125 sorts the processes of the agent 120 by memory usage of each process. When disabling 306 processes, the circuit breaker 125 disables one or more of the processes using a highest amount of memory, until a specified amount of memory is freed. By disabling at least a portion of the agent 120, the circuit breaker 125 leaves resources of the app server 110 available for the application 115 and reduces the likelihood of the app server 110 crashing.

The circuit breaker 125 continues to monitor the state of the app server 110 after disabling the one or more processes, and re-enables 308 the disabled processes of the agent 120 if the free memory and garbage collection time return to a normal state. For example, the circuit breaker 125 re-enables the disabled processes in response to the amount of free memory increasing above the memory threshold and the duration of the garbage collection process falling below the garbage collection threshold. The agent 120 then resumes monitoring of the app server 110.

The foregoing description of the embodiments of the disclosure has been presented for the purpose of illustration;

it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method for monitoring an application server, the method comprising:
    observing an amount of free memory available in the application server and a duration of a garbage collection process performed by the application server, the application server executing an agent comprising a plurality of processes for monitoring performance of the application server;
    anticipating based on the duration of the garbage collection process and the amount of free memory, a likely crash of the application server; and
    responsive to anticipating the likely crash, disabling one or more processes of the agent.

2. The method of claim 1, wherein anticipating the likely crash comprises:
    comparing the duration of the garbage collection process to a garbage collection threshold;
    comparing the free memory to a memory threshold; and
    responsive to the duration of the garbage collection process being above the garbage collection threshold and the free memory being below the memory threshold, anticipating the likely crash.

3. The method of claim 1, wherein observing the duration of the garbage collection process comprises:
    identifying a garbage collection process in a tenured memory pool of the application server, the tenured memory pool storing objects created by the application server that are above a threshold age; and
    observing a duration of the identified garbage collection process.

4. The method of claim 3, wherein identifying the garbage collection process in the tenured memory pool comprises:
    observing a number of garbage collections performed by each of a plurality of garbage collection processes in the application server during a specified period of time; and
    identifying a garbage collection process performing a least amount of collections as the garbage collection process in the tenured memory pool.

5. The method of claim 1, further comprising:
    after disabling the one or more processes of the agent, monitoring the amount of free memory available in the application server and the duration of the garbage collection process; and
    enabling the one or more processes of the agent responsive to the amount of free memory being above a memory threshold and the duration of the garbage collection process being below a garbage collection threshold.

6. The method of claim 1, wherein the agent monitors processes and response time of the application server.

7. The method of claim 1, wherein the one or more processes of the agent include one or more high memory utilization processes.

8. A non-transitory computer readable storage medium storing executable computer program instructions, the instructions when executed by a processor causing the processor to:
    observe an amount of free memory available in the application server and a duration of a garbage collection process performed by the application server, the application server executing an agent comprising a plurality of processes for monitoring performance of the application server;
    anticipate based on the duration of the garbage collection process and the amount of free memory, a likely crash of the application server; and
    responsive to anticipating the likely crash, disable one or more processes of the agent.

9. The non-transitory computer readable storage medium of claim 8, wherein the instructions causing the processor to anticipate the likely crash comprise instructions that when executed by the processor cause the processor to:
    compare the duration of the garbage collection process to a garbage collection threshold;

compare the free memory to a memory threshold; and
responsive to the duration of the garbage collection process being above the garbage collection threshold and the free memory being below the memory threshold, anticipate the likely crash.

10. The non-transitory computer readable storage medium of claim 8, wherein the instructions causing the processor to observe the duration of the garbage collection process comprise instructions that when executed by the processor cause the processor to:
identify a garbage collection process in a tenured memory pool of the application server, the tenured memory pool storing objects created by the application server that are above a threshold age; and
observe a duration of the identified garbage collection process.

11. The non-transitory computer readable storage medium of claim 10, wherein the instructions causing the processor to identify the garbage collection process in the tenured memory pool comprise instructions that when executed by the processor cause the processor to:
observe a number of garbage collections performed by each of a plurality of garbage collection processes in the application server during a specified period of time; and
identify a garbage collection process performing a least amount of collections as the garbage collection process in the tenured memory pool.

12. The non-transitory computer readable storage medium of claim 8, further comprising instructions that when executed by the processor cause the processor to:
after disabling the one or more processes of the agent, monitor the amount of free memory available in the application server and the duration of the garbage collection process; and
enable the one or more processes of the agent responsive to the amount of free memory being above a memory threshold and the duration of the garbage collection process being below a garbage collection threshold.

13. The non-transitory computer readable storage medium of claim 8, further comprising instructions that when executed by the processor cause the processor to:
sending a notification to the application server responsive to disabling the one or more processes of the agent.

14. The non-transitory computer readable storage medium of claim 8, wherein the agent monitors processes and response time of the application server.

15. The non-transitory computer readable storage medium of claim 8, wherein the one or more processes of the agent include one or more high memory utilization processes.

16. A server comprising:
at least one processor; and
a non-transitory computer readable storage medium storing executable computer program instructions, the instructions when executed by the processor cause the processor to perform steps comprising:
observing an amount of free memory available in the application server and a duration of a garbage collection process performed by the application server, the application server executing an agent comprising a plurality of processes for monitoring performance of the application server;
anticipating based on the duration of the garbage collection process and the amount of free memory, a likely crash of the application server; and
responsive to anticipating the likely crash, disabling one or more processes of the agent.

17. The server of claim 16, wherein anticipating the likely crash comprises:
comparing the duration of the garbage collection process to a garbage collection threshold;
comparing the free memory to a memory threshold; and
responsive to the duration of the garbage collection process being above the garbage collection threshold and the free memory being below the memory threshold, anticipating the likely crash.

18. The server of claim 16, wherein observing the duration of the garbage collection process comprises:
identifying a garbage collection process in a tenured memory pool of the application server, the tenured memory pool storing objects created by the application server that are above a threshold age; and
observing a duration of the identified garbage collection process.

19. The server of claim 18, wherein identifying the garbage collection process in the tenured memory pool comprises:
observing a number of garbage collections performed by each of a plurality of garbage collection processes in the application server during a specified period of time; and
identifying a garbage collection process performing a least amount of collections as the garbage collection process in the tenured memory pool.

20. The server of claim 16, wherein the instructions when executed by the processor further cause the processor to:
after disabling the one or more processes of the agent, monitoring the amount of free memory available in the application server and the duration of the garbage collection process; and
enabling the one or more processes of the agent responsive to the amount of free memory being above a memory threshold and the duration of the garbage collection process being below a garbage collection threshold.

* * * * *